March 31, 1964  E. K. KARLSSON  3,126,688
CROP PICKING AND TREATING APPARATUS
Filed Jan. 31, 1962  7 Sheets-Sheet 1

INVENTOR.
Elof K. Karlsson
Paul O. Pippel
Atty.

March 31, 1964 E. K. KARLSSON 3,126,688
CROP PICKING AND TREATING APPARATUS
Filed Jan. 31, 1962 7 Sheets-Sheet 2

INVENTOR.
Elof K. Karlsson
Paul O. Pippel
Atty.

March 31, 1964  E. K. KARLSSON  3,126,688
CROP PICKING AND TREATING APPARATUS
Filed Jan. 31, 1962  7 Sheets-Sheet 3

INVENTOR.
Elof K. Karlsson
Paul O. Pippel
Atty.

March 31, 1964  E. K. KARLSSON  3,126,688
CROP PICKING AND TREATING APPARATUS
Filed Jan. 31, 1962  7 Sheets-Sheet 5

INVENTOR.
Elof K. Karlsson
Paul O. Pippel
Atty.

United States Patent Office 3,126,688
Patented Mar. 31, 1964

3,126,688
CROP PICKING AND TREATING APPARATUS
Elof K. Karlsson, East Moline, Ill., assignor to International Harvester Company, Chicago, Ill., a corporation of New Jersey
Filed Jan. 31, 1962, Ser. No. 170,075
6 Claims. (Cl. 56—18)

This invention is directed to a novel crop picking and treating apparatus, and more specifically to an improved picker and sheller for corn or similar crops which is appreciably more compact, rugged, simple, and substantially lighter in weight than the devices previously utilized in this agricultural operation.

In prior art corn pickers, such as a two-row picker unit for mounting on a tractor, shelling units are frequently provided as an optional attachment. That is, many units provide for the picking, cleaning, and husking of the corn, and the conveying of the ears rearwardly along each side of the tractor to a location at which the ears are fed into a trough or into the entranceway of a conveyor, for lifting the ears upwardly and rearwardly and depositing them in a trailing wagon. In certain of these units, provision has been made to position a shelling unit transversely of the longitudinal axis of the tractor and generally behind the position of the tractor operator to effect a shelling of the ears before the crop material is passed into the conveyor. Certain shortcomings of these prior art arrangements include the positioning of the heavy sheller unit rearwardly where it is difficult to balance on its mounting, and the uneconomc conveying of the picked and cleaned ears down each side of the tractor before the shelling operation is commenced.

It is, therefore, a primary object of the present invention to provide a corn picking and shelling apparatus in which the shelling units are mounted generally over the rear axle of the tractor, thereby to afford a strong and readily balanced mechanical arrangement.

Another important object of the invention is the positioning of the corn sheller unit to receive the ears directly from the picking unit, without any intermediate conveying and/or husking of the corn between the picking and shelling locations.

Still another object of the invention is to provide an improved picker-sheller apparatus of considerably reduced size and weight as contrasted to prior art devices, thereby simplifying the construction and mounting of the apparatus and greatly facilitating both the mounting of the picker unit on, and the disconnecting of the picker unit from, the tractor.

A salient object of the invention is the provision of a corn sheller apparatus which operates efficiently even when the ears have not been husked prior to the shelling operation.

A related object of the invention is the provision of such a corn sheller apparatus which effectively discards the husks and other trash without ejecting the shelled corn with the trash.

The foregoing and other objects are attained in a preferred embodiment of the invention by a novel picker and sheller unit carried by a tractor having a waist portion and a pair of rear drive wheels, each wheel being spaced outwardly from the body portion of the tractor. A conventional corn picking unit is supported to one side of and adjacent the waist portion of the tractor; the picking unit includes means for snapping the ears from the stalks, and for passing the snapped ears upwardly and rearwardly to a reference feed location. In accordance with an important aspect of the invention, the novel sheller unit is disposed longitudinally relative to the tractor body, that is, substantially parallel thereto, and in the space defined between one of the rear drive wheels and the tractor body. A portion of the sheller unit extends to a point adjacent the reference feed location to receive the snapped ears. After the shelling unit has removed the kernels from the cobs, the kernels are passed rearwardly in a longitudinal feed auger, and the shelled corn is transferred therefrom to a transverse feed auger located adjacent the longitudinal auger and makes a substantial right angle therewith. The structural features for effecting the transfer between the longitudinal and transverse feed augers represent another important feature of the invention, which transfer is effected not only at right angles but also the corn is lifted upwardly at the point of transfer from the longitudinal auger to the transverse auger. Other features, concerning the drive to the various units and the cooperation of the components of the invention, will be set forth with particularity in the subsequent explanation.

The best mode contemplated for carrying out the invention will now be described. To enable those skilled in the art to make and use the invention, such description is set forth in connection with the accompanying drawings, in the several figures of which like reference numerals identify like elements, and in which:

FIGURE 16 is a top view.

Figures 1, 14:
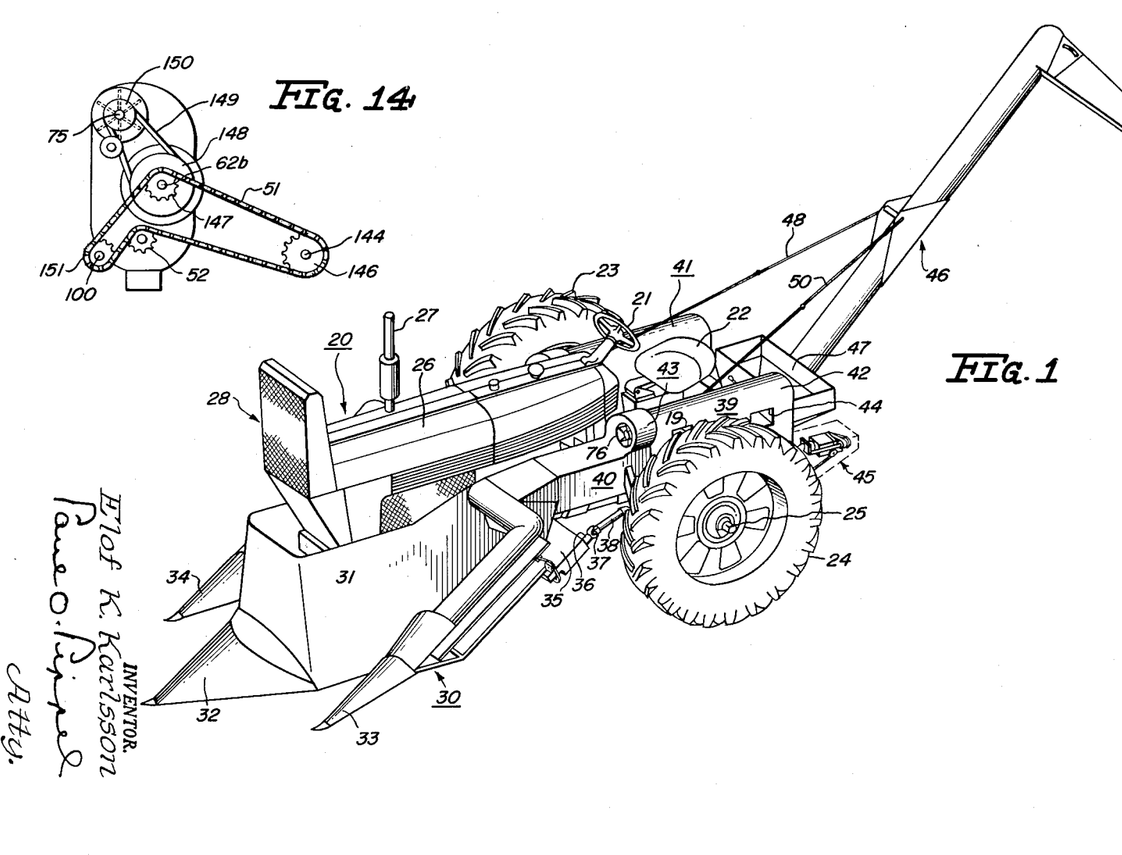
FIGURE 1 is a perspective illustration, partly cut away, of a preferred embodiment of the invention mounted on a tractor.
FIGURE 14 is a rear view, related to the showing of FIGURE 4 but taken on a reduced scale, depicting the drive arrangement for certain components of the invention.

In the perspective illustration of FIGURE 1, an embodiment of the invention is shown mounted on a conventional tractor 20, which includes a steering wheel 21, a seat 22 for the operator, a pair of rear drive wheels 23 and 24 journaled on an axle 25, and a frontal or hood portion 26 in the waist area of the tractor from which an exhaust pipe 27 projects upwardly. A radiator airscoop 28 is affixed to the upper and front portions of tractor 20, to increase the air intake for the radiator and also to prevent air blockage when excessive trash conditions are encountered during the picker operation. The use of such an attachment to protect the motor against overheating and minimize the fire hazard which would otherwise be occasioned as the flammable trash encounters the hot motor is well known. For clarity of illustration, however, and to better depict the exact orientation of the novel picker-sheller with respect to the tractor, the radiator airscoop 28 has been omitted from the succeeding figures.

The preferred embodiment of the invention illustrated and described herein includes three major components, a picking unit, a shelling unit, and a carrying or conveying arrangement for the shelled corn. The first component is shown as a two-row snapping unit 30 which comprises a shroud portion 31 from which a center divider 32 extends, and left and right gatherer points 33 and 34, respectively ("left" and "right," as used herein, refer to left and right sides of the tractor looking from the rear toward the front thereof, and the terms "front" and "rear" likewise are referenced by the front and rear portions of the tractor). Other conventional elements, such as the gatherer chains, snapping rolls, etc., are not illustrated in the general showing of FIGURE 1. The corn-picking unit including the gathering and snapping elements is thus fairly conventional, being utilized to direct standing corn between the points, snap the ears from the stalks, and feed the ears upwardly and rearwardly to the novel sheller units for processing.

Power for operating the gathering chains, snapping rolls, and other elements is translated over drive components including certain elements protected behind (and thus not visible in FIGURE 1) a guard unit 35, from which a power shaft 36 extends. A universal joint 37 intercouples shaft 36 with a short intermediate shaft 38, which receives rotary drive power over another universal joint and shaft, not visible in this view; such power is ultimately derived from the power take-off element of the tractor in a manner to be described hereinafter.

The second major component of the novel system is the shelling unit, which in this embodiment comprises two separate shelling units 40 and 41, shown mounted on the left and right sides of the tractor to the rear of the associated picking units. Shelling unit 40 includes a sheet metal housing 42, apertured as referenced by numeral 76 to define an entrance cavity for a fan unit 43 at the upper portion thereof. The construction and purpose of such fan unit, which includes the forward part of housing 42 and of shaft 75, will be set forth hereinafter. Another aperture 44 in housing 42 is visible in FIGURE 1, and aperture 44 is one of two similar exit apertures through which light dirt and trash are expelled under the impetus of a blower 39 mounted to the rear of fan unit 43 within housing 42. The drive conversion arrangement 45 shown at the left rear of the tractor is part of the system on the left side for utilizing rotary power to drive the feed augers, as will be described hereinafter.

The novel conversion system includes components not visible in FIGURE 1, and further comprises an elevator unit 46, utilized to feed the shelled corn upwardly from the transverse feed auger (not visible in FIGURE 1) and from relief bin 47 mounted centrally as shown. A pair of support cables 48 and 50 extend to an intermediate point of the elevator arrangement, to provide the necessary structural support for this portion of the system.

Figure 2:
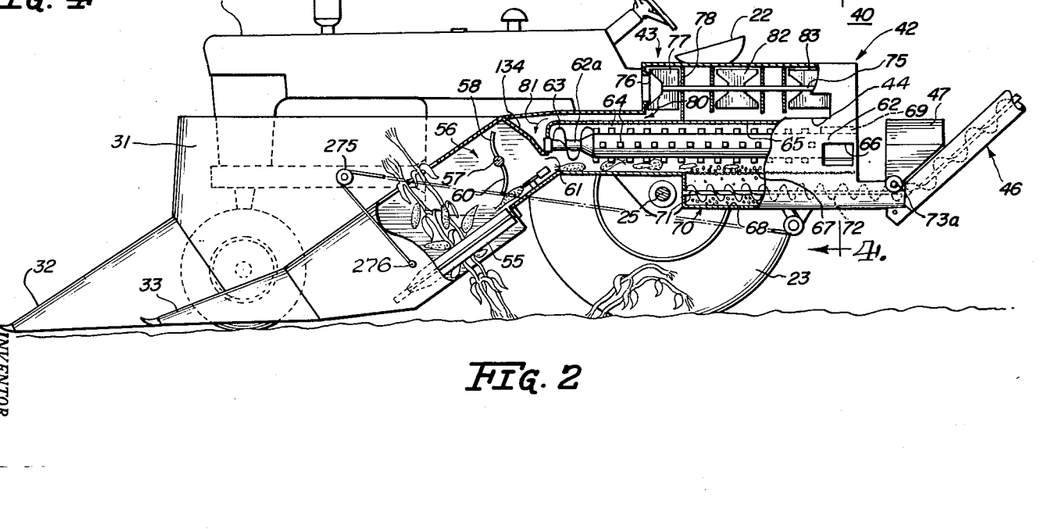
FIGURE 2 is a side view, partly broken away, of the embodiment shown in FIGURE 1.
Figure 4:
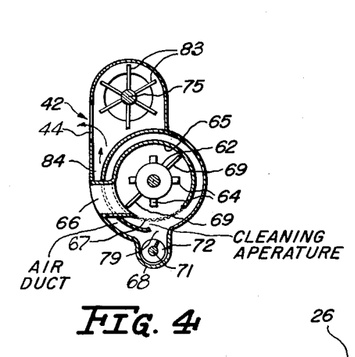
FIGURE 4 is a front sectional view of the blower, sheller, and auger arrangement taken along the line 4—4 of FIGURE 2 and on a scale enlarged relative to the scale of FIGURE 2.

As shown in FIGURE 2, corn stalks directed between the gatherer points are inclined forwardly as the ears are pulled from the stalks by the snapping rolls, such as roll 55. As the snapped ears are conveyed upwardly and rearwardly by suitable fingers or teeth projecting from the gatherer chains, a final impetus is imparted to the ears of corn by a pusher assembly 56 including a shaft 57 on which a pair of fingers or paddles 58 and 60, constructed of tire carcass or similar materials, are mounted. As shown, an ear is about to be flipped by paddle 60 through aperture 61, which constitutes both the exit aperture for the picker apparatus and the entrance aperture for sheller unit 40. Just to the right (as viewed in FIGURE 2) of aperture 61 is a narrow shaft segment 62a on which a screwflight 63 is affixed with the proper pitch to forward the ears from aperture 61 toward the shelling area. One end of shaft 62a is suitably journaled in a bearing (not illustrated), and the other end of the shaft tapers outwardly to the diameter of the body of shelling cylinder 62. A plurality of outwardly projecting impacting studs or teeth 64 are affixed to cylinder 62 to engage the surfaces of the ears and effect the shelling operation as cylinder 62 is rotated. A pair of paddles 69 are affixed to diametrically opposite portions of cylinder 62 at the rear thereof, to eject the cobs and trash through the cob chute which includes aperture 66, as shown in FIGURE 4. A concave 65 is defined between cylinder 62 and sections of housing 42.

Beneath cylinder 62, a foraminous element such as a screen or mesh-type closure 67 permits the shelled corn to drop through the bottom of the concave into a trough 68, in which a longitudinal shelled corn feed auger 70 is positioned. Auger 70 includes a shaft 71 on which a screwflight 72 is affixed. As will be shown in more detail in subsequent illustrations, including FIGURES 9–11, adjacent the termination of longitudinal feed auger 70 a transverse feed auger section 73a is positioned at right angles with respect to auger 70, to feed the shelled corn centrally behind the tractor for subsequent movement upwardly through the elevator auger 46.

In the upper portion of housing 42 a shaft 75 is journaled, and on the front portion of this shaft, just behind entrance aperture 76 of fan unit 43, fan blades 77 are affixed. A bulkhead or wall 78 separates the chamber of fan 43 from that of the blower unit mounted rearwardly of the fan. Fan blades 77 are pitched and driven in such manner that air drawn through entrance aperture 76 is directed downwardly and forwardly as indicated by the arrow 80, and this air current is blown forwardly between the outer wall of the fan unit and the housing of concave 65. As indicated by arrow 81, the air current is deflected by suitable shields such as member 134, which is turned downwardly and through the entrance aperture 61 toward the rear of the concave, thereby to provide a substantial air draft in this entrance aperture. A certain amount of shelling occurs as the ears of corn pass through entrance aperture 61, and the blast of air provided by the fan unit is sufficient so that the kernels thus separated from the cob are blown rearwardly to drop through screen 67 into the longitudinal shelled corn conveyor.

In the blower unit just behind fan unit 43, a first set of blades 82 is mounted at the forward end thereof and a second set of blades 83 is affixed at the rear of shaft 75. Thus, concomitantly with rotation of fan blades 77, blade sets 82 and 83 are rotated to provide air currents within the upper portion of housing 42. Blades 83 provide the discharge current through aperture 44 (FIGURE 1) and blades 82 send a like current through aperture 19. Thus there is a continuous air flow into aperture 76, through the fan unit, aperture 61, the chamber of the shelling unit, the blower unit, and out through the discharge apertures 19 and 44 of the blower unit. Light dust, dirt, and other particles are discharged through such apertures at the same time that the heavy material, including the cobs and the husks, are thrown out through discharge aperture 66 (FIGURE 2) under the impetus of paddles 69.

Figure 3:
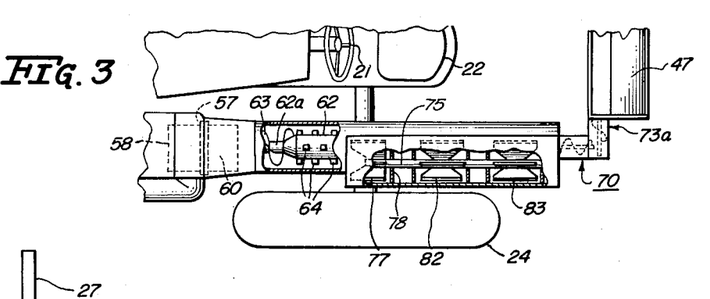
FIGURE 3 is a partial view, with portions broken away to better illustrate the inventive components, particularly illustrating the mounting of the sheller arrangement with respect to the rear axle of the tractor.

FIGURE 3 shows the orientation of the picker unit, including the fan-and-blower arrangement, with respect to the rear axle and drive wheel of the tractor. An important part of the inventive concept resides in the provision of the shelling unit to receive the picked corn directly from the picking unit, without the interposition of husking rolls or conveying apparatus to carry the ears rearwardly and feed the ears through a shelling cylinder positioned transversely with respect to the longitudinal axis of the tractor. It has been found with such an arrangement a shelling unit only 40 inches in length can be utilized, and the weight of the entire picker-sheller arrangement can be reduced by approximately one-third as contrasted to prior art devices.

FIGURE 4 particularly illustrates the vertical alignment of the blower unit over the concave, with the longitudinal feed auger including shaft 71 and screwflight 72 positioned therebeneath for receiving the shelled corn and passing the corn toward the rear of the shelling unit, in addition to structural features previously noted.

Figures 5, 6, 7, 8:
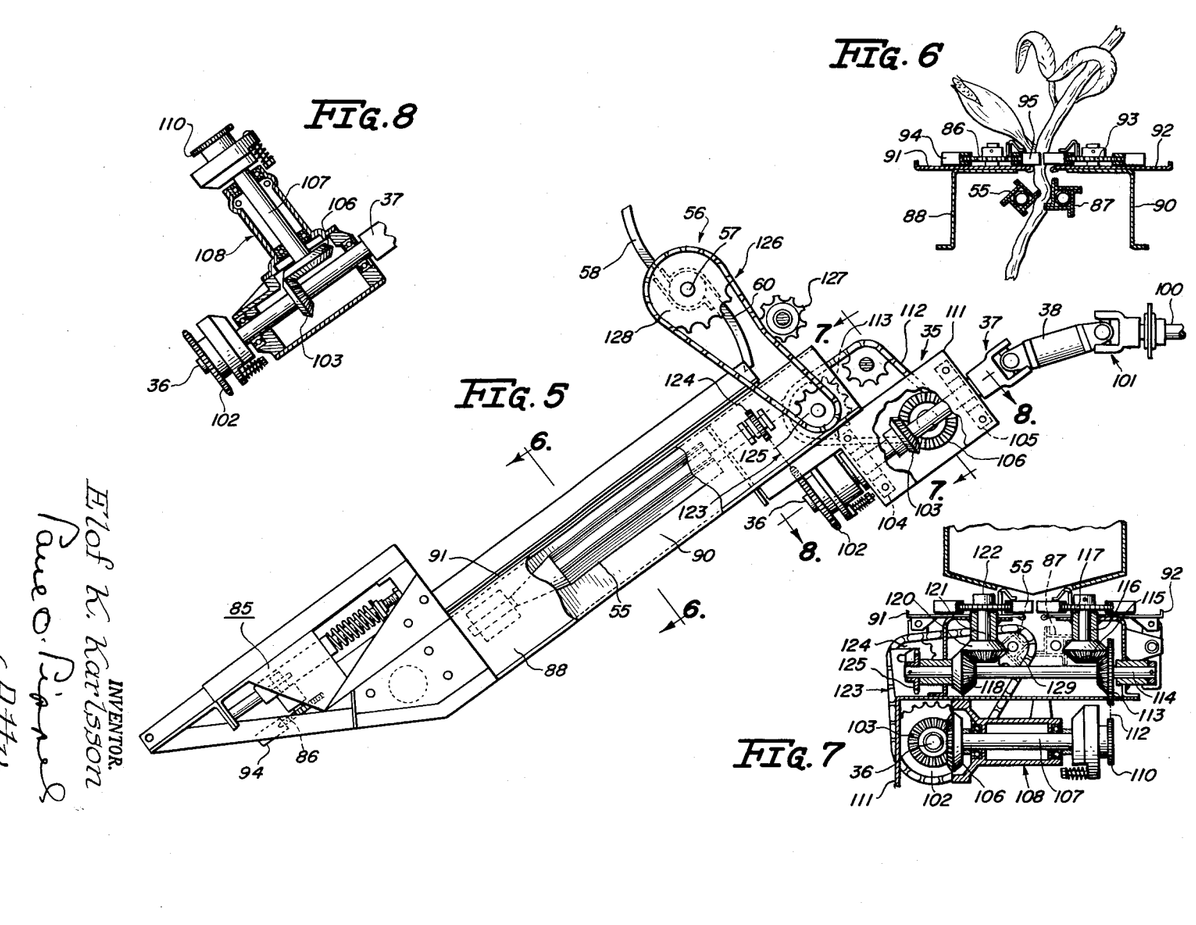
FIGURE 5 is a side view on an enlarged scale, broken away, illustrating portions of the mechanism for picking the ears and feeding the ears toward the sheller unit.
FIGURE 6 is a sectional view, taken along the line 6—6 of FIGURE 5, particularly illustrating certain components for snapping the ears from the stalks.
FIGURE 7 is another sectional view, taken along the line 7—7 of FIGURE 5, particularly illustrating certain drive arrangements of the picking and feeding components.
FIGURE 8 is a sectional view, taken along the line 8—8 of FIGURE 5, illustrating other aspects of the picking and feeding drive mechanism.

In the side view of FIGURE 5, the mechanism for translating drive to the gathering chains and snapping rolls is illustrated. One of the snapping rolls, referenced by numeral 55, is there illustrated, and roll 55 is journaled at its lower end in a conventional bearing arrangement which is not shown in detail. A mounting arrangement 85 is also provided at the lower end for the shaft on which sprocket 86 is mounted, with sprocket 86 serving to index and reverse the direction of the gathering chains to one side of the snapping axis. Inasmuch as the mounting arrangement for the snapping chains is conventional, and includes a system as indicated for changing the position of sprocket 86 to vary the degree of tension in the chains, no further explanation of such elements will be given herein.

Certain of the equipment depicted in FIGURE 5, including the conventional snapping rolls and gathering chains, is also shown in FIGURE 6. The relation of the snapping rolls 55 and 87 with respect to side support channels 88 and 90 is there depicted. Stripper plates 91 and 92 are shown abutting channels 88 and 90, respectively. Sprockets 86 and 93 are positioned as shown to index the respective gathering chains. For example, the gathering chain which is indexed around sprocket 86 includes a plurality of fingers or forwarding elements, of which fingers 94 and 95 are visible in the showing of FIGURE 6. Those skilled in the art will readily recognize the conformity of the snapping and gathering elements with known structures.

Considering now the structure for translating rotary drive from any of the plurality of elements coupled to the tractor P.T.O. (not shown), in the upper right-hand corner of FIGURE 5 shaft 100 is driven by elements coupled between such shaft and the power take-off elements of the tractor, or associated power drive means. Shaft 100 is coupled over a universal coupling joint 101 to an intermediate shaft 38, in turn coupled over another universal joint 37 to drive shaft 36. A sprocket wheel 102 is affixed by suitable means to the end of shaft 36 remote from universal coupling 37, for concomitant rotation therewith as shaft 36 is angularly displaced. A bevel gear 103 mounted on shaft 36 is also rotated simultaneously with angular displacement of the shaft. A pair of bearing units 104 and 105 supports shaft 36 during operation thereof.

Considering now the translation of rotary power from shaft 36, the structure including bevel gear 103 for deriving power from this point on the shaft is better illustrated in FIGURE 8. As there shown, bevel gear 103 is fitted on shaft 36, and positioned to mesh with another bevel gear 106 mounted at one end of shaft 107, suitably supported within a bearing which in turn is contained within a housing assembly 108. At the other end of shaft 107 a sprocket 110 is positioned for rotation as shaft 107 is angularly displaced. The manner in which the driving power is translated from sprocket 110 to other units of the system is illustrated in FIGURE 7.

As there depicted, a chain indicated by dash lines 112 provides a driving connection between sprocket 110 and the outer sprocket portion of a bevel gear 113, positioned on shaft 114 to mesh with another bevel gear 115 affixed to the lower portion of shaft 116. An indexing sprocket 117 for the right-hand (as seen in FIGURES 6 and 7) gathering chain is affixed to the upper portion of shaft 116 for rotation therewith, over the driving connection just described. Another bevel gear 118 is affixed to shaft 114 in a position to mesh with bevel gear 120, affixed to the lower end of shaft 121 to effect angular displacement thereof and a corresponding rotation of the indexing sprocket 122 affixed to the upper portion thereof, thereby to provide for indexing and driving of the left-hand gathering chain. Fingers of each gathering chain are indicated in FIGURE 7 to illustrate the relation thereof with respect to stripping plates 91 and 92.

Referring again to FIGURE 7, a drive chain 123 is indexed around the teeth of sprocket 102, passing upwardly over an idler sprocket 124 and around another sprocket 129 affixed to the rear end of snapping roll 55. Accordingly, the left-hand snapping roll also receives positive drive as shaft 36 is rotated. A set of meshing gears is positioned on the two snapping rolls 55 and 87 to impart positive drive to snapping roll 87, in a sense opposite the rotation of snapping roll 55 as it is driven over the just-described connection. In addition to the driving of the gathering chains and snapping rolls, positive rotation of the paddle wheel ear-forwarding arrangement 56 must be provided.

Accordingly, as depicted in FIGURE 7, another sprocket wheel 125 is affixed to one end of shaft 114, which is driven as previously described over chain 112 and shaft 107 as shaft 36 is rotated. Sprocket 125 is coupled over a chain 126 (FIGURE 5) which passes adjacent an idler sprocket 127 and over another sprocket 128, affixed to shaft 57 which also supports the paddles 58 and 60. Thus a structure is provided to forward the snapped ears of corn from the picking unit toward and into the shelling arrangement.

Figures 9, 18:
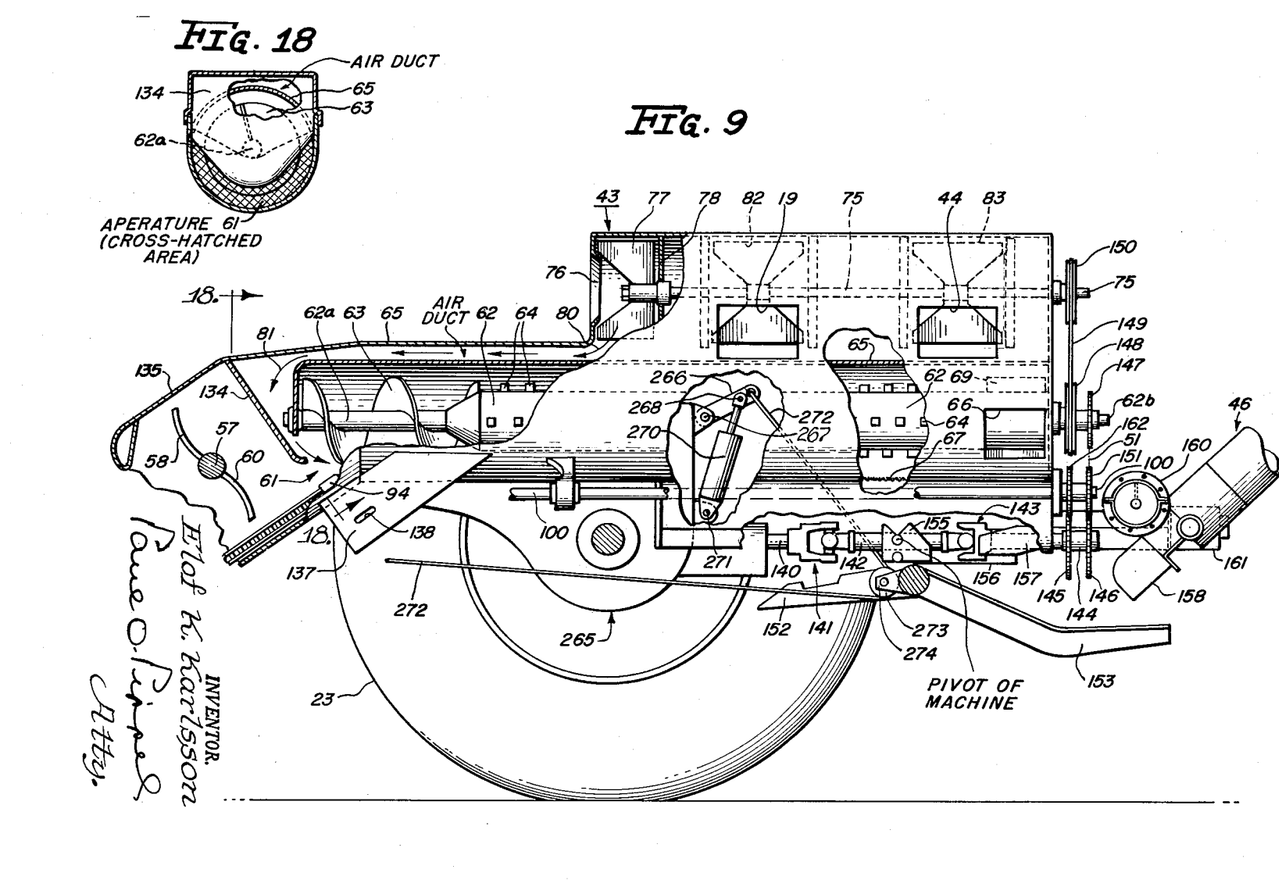
FIGURE 9 is a side view, taken on an enlarged scale with respect to that of FIGURE 2 to illustrate the blower, sheller, and certain related components of the invention in more detail.
FIGURE 18 is an illustrative diagram, similar to a sectional view taken along lines 18—18 in FIGURE 9, useful in explaining the configuration of certain elements of the inventive combination.

Considering now the shelling structure as depicted in FIGURE 9, the forward end of the unit there illustrated includes a sheet metal flap 135 which, when joined with cooperating sheet metal portions of the snapping and ear forwarding arrangements, effectively forms a housing through which the ears are passed. Reference numeral 134 identifies a partition disposed along the line of demarcation between the snapping unit and the shelling arrangement, and shaped to provide aperture 61, located between partition 134 and bearing bracket 59, with the configuration represented by the cross-hatched area in FIGURE 18. To the right of this line, another flap 137 which includes an elongated bolt hole 138 is provided for connection to another corresponding flap (not shown) extending from the cooperating picking and ear forwarding unit.

Driving power for actuating the various components of the picker and sheller is derived from the P.T.O. shaft of the tractor, designated by numeral 140, and shown connected over a knuckle 141, a flexible driving link 142, and another knuckle 143 to a shaft extension 144, on which a pair of sprockets 145 and 146 are mounted. This explanation is concerned only with the description of one picker-sheller unit, the one at the left side of the tractor, and thus certain elements shown in FIGURE 9 (e.g., sprockets 145 and 162) will not be adverted to, inasmuch as those elements are part of the power train for translating energy to the picker-sheller at the right side of the tractor.

The power transmitted from sprocket 145 is carried over chain 51 (see FIGURE 14) to a sprocket 147, affixed on a shaft 62b which extends from one end of sheller cylinder 62. Chain 51 is also indexed over sprocket 151 on shaft 100, and over an idler sprocket 52.

Also mounted on shaft 62b is a sheave 148, over which a belt 149 provides a driving connection with a sheave 150 affixed to shaft 75, thereby completing the driving arrangement to impart rotation to shaft 75 and thus effect operation of the fan and blower units. Sprocket 151 mounted on shaft 100 transfers the drive to the snapping rolls and related elements. Thus the same driving chain which translates rotational power from the tractor power take-off shaft effects the displacement of sheller shaft 62b and of the picker shaft 100 over sprockets 147 and 151, respectively. Sprocket 162 (FIGURE 9), also journaled on shaft 100, is utilized to transfer the drive between the P.T.O. unit of the tractor and a gear box at the rear of the sheller unit, thus to provide for rotational drive of both the longitudinal and the transverse shelled corn feed augers, together with the elevator auger.

Those skilled in the art will recognize the utilization of elements 152 and 153 to provide for a fast hitch between the tractor and the novel apparatus of the invention. Member 154 is a frame member to reinforce the sheller arrangement, and elements 155, 156 and 157 comprise the components for latching the picker-sheller arrangement over a transverse bar on the tractor unit, so that the pivot of the picker-sheller machine is at the point indicated by the legend.

A housing 158 encloses the rear portion of the longitudinal shelled corn feed auger which extends below the housing 160 of the transverse feed auger; as will be seen hereinafter, there is a connection between these two augers. A gear housing 161 protects several gears in a manner to be illustrated more fully hereinafter, and a portion of the auger elevator 46 is depicted in FIGURE 9 to show the relation thereof with respect to the shelled corn feed auger and the transverse auger housings.

As noted previously, FIGURE 10 is a view taken looking toward the right rear portion of the inventive structure. As there shown, a shaft extension 165 is provided, which shaft is intercoupled (by means not illustrated but which may include conventional sprocket and chain arrangements) to sprocket 162 (FIGURE 9) on shaft 100, thereby to provide for rotation of shaft extension 165 (FIGURE 10) as the picker-sheller receives power from the tractor P.T.O. unit. Shaft 165 is connected to shaft 166 by a coupling unit 168. The other end of shaft 166 passes through and is supported in a bearing unit 170, which bearing unit in turn is supported on a gear box cover 171. The extremity of shaft 166 is connected by a pin or other suitable means 172 to a hub section 173 on which a sprocket 174 is affixed. Aligned with sprocket 174 is another sprocket 175, suitably affixed to a hub section 176 which is pinned or otherwise connected to a shaft 177. Chain means can be affixed over each of sprockets 174 and 175 for effecting simultaneous angular displacement of sprocket wheels 174 and 175.

Figure 10:
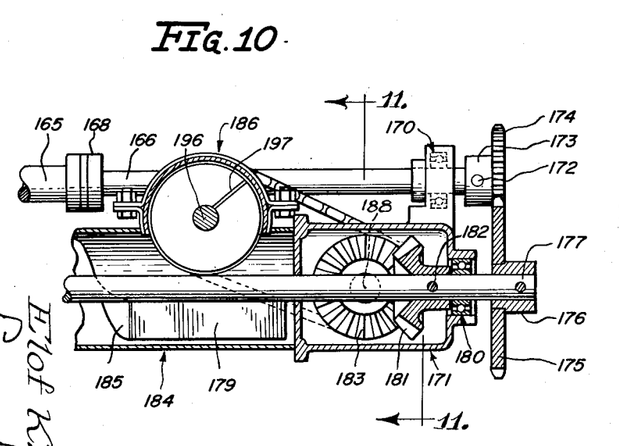
FIGURE 10 is a side view, partly in section and partly broken away, looking from the central rear area toward the right side, illustrating portions of the apparatus for moving the shelled corn toward the center rear area of the tractor for subsequent conveying upwardly by the elevator.

Just to the left of sprocket 175 in FIGURE 10, shaft 177 is supported in a bearing unit 180, itself supported in a suitably apertured end portion of housing 171. A bevel gear 181 is connected by pin means 182 to shaft 177 for displacement therewith to effect rotation of another bevel gear 183. Shaft 177 extends through the end wall of gear box housing 171, and into housing 184 of the right-hand longitudinal feed auger. Thus the clean shelled corn is fed from front to rear below the shelled unit, or left to right as shown in FIGURE 10, by screwflight 185, and is thrown upwardly by paddle 179, affixed to shaft 177 as shown, through a suitably apertured portion 187 of housing 186, better shown in FIGURE 12.

Figure 11:
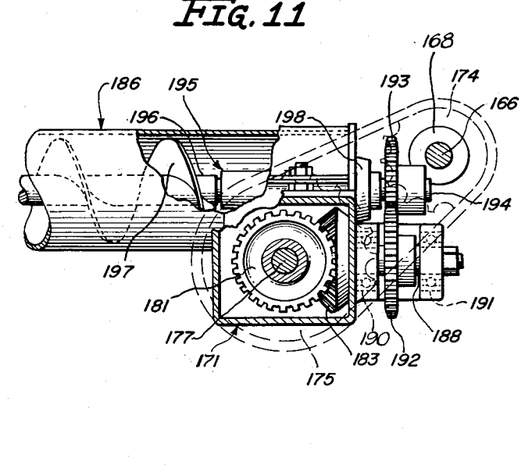
FIGURE 11 is a rear view illustrating certain of the components depicted in FIGURE 10.

As shown in FIGURE 11, bevel gear 183 is integral with a shaft 188, which shaft is suitably supported in bearing units 190 and 191. A sprocket 192 is affixed to shaft 188, and aligned with another sprocket 193 so that a chain (not shown) passing over each of sprockets 192 and 193 transmits drive between shaft 188 and shaft extension 194. A coupling unit 195 interconnects shaft extension 194 with the central shaft portion 196 of the right rear portion of the transverse feed auger. A screwflight 197 is positioned around and affixed to central core 196 of the transverse auger in conventional manner to pass the shelled crown toward the auger elevator.

Figures 12, 13:
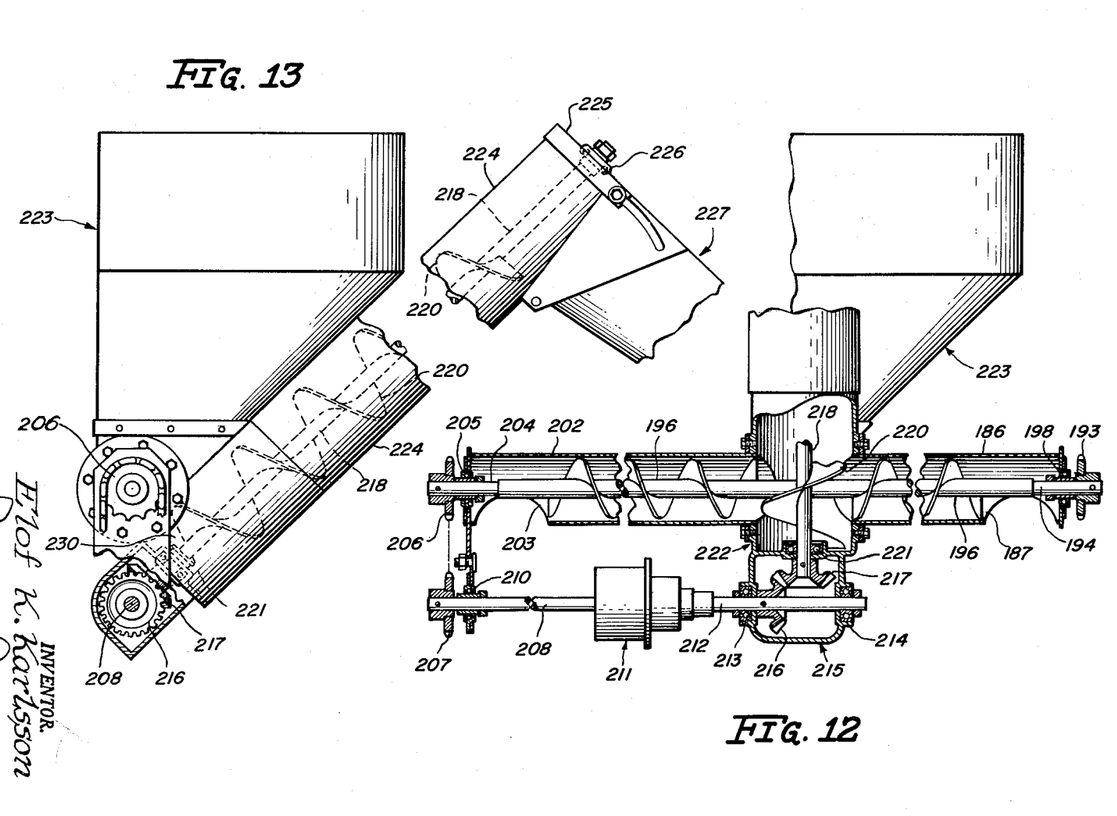
FIGURE 12 is a rear view, partly in section and partly broken away, illustrating certain transverse auger elements and the transmission of power therefrom to the elevator auger.
FIGURE 13 is a side view, partly broken away and partly in section, including certain of the elements depicted in FIGURE 12.

In FIGURE 12, shaft 196 is shown extending from the right section into the left section of the transverse feed auger, within housing 202. Housing 202 is apertured at 203 to provide for entrance of the shelled corn from the longitudinal shelled corn feed auger 70 (FIGURE 2). In FIGURE 12, the left end of shaft 196 is connected to a shaft extension 204 supported in a bearing unit 205 in the end wall of housing 202, and a sprocket 206 is affixed to the end of shaft extension 204. A similar sprocket 207 is correspondingly affixed to a shaft 208, supported in a bearing unit 210 which is affixed to a portion of the frame member which depends from the end of housing 202. In conventional manner a chain (not shown) is aligned over sprockets 206 and 207 to transmit rotational drive from shaft extension 204 at the end of the transverse feed auger to shaft 208, the right end of which is received within a throwout clutch unit 211. The throwout clutch may be a conventional unit which, in the position illustrated, transmits rotational drive between shaft 208 and shaft 212, and is operable under the impetus of a handle connector (not shown) which extends from unit 211 to a location adjacent the tractor seat, to enable the operator to disengage the throwout clutch and thus halt rotation of shaft 212 while angular displacement of shaft 208 is continued. Such operation is sometimes desirable during sharp turns, etc., of the equipment during which the end of the auger elevator is not aligned over a trailing wagon, to obviate the possibility of losing some of the shelled corn. The provision of a hopper to retain the corn which would otherwise pile up centrally in the transverse feed auger will be described and explained hereinafter.

The right-hand portion of shaft 212 is supported in bearing units 213 and 214, themselves affixed in the wall portions of housing 215 as illustrated. A bevel gear 216 is affixed to shaft 212 as shown, and gear 216 is disposed in mating engagement with another bevel gear 217, itself fastened on the extremity of the auger elevator shaft 218 (FIGURE 13) around which a screwflight 220 is disposed. The lower portion of shaft 218 is supported in a bearing unit 221, itself affixed in the juncture of housing 215 with the housing portion 222 which encloses the juncture of the transverse feed auger with the auger elevator, together with the entrance to the hopper 223.

The upper extremity of the elevator housing 224 is closed by an end wall 225 in which a bearing support 226 is affixed, and the end of shaft 218 is journaled in bearing unit 226. The end of housing 224 is apertured at a bottom portion and affixed to a short trough 227, only a portion of which is shown, to provide for egress of the shelled corn toward a wagon or other depository.

In FIGURE 13, reference numeral 230 identifies the apertured area through which the shelled corn falls downwardly as it is moved centrally by the transverse feed auger including shaft 196. From this location the corn is normally taken upwardly and rearwardly by the elevator auger including shaft 218 and screwflight 220. However, when throwout clutch 211 is disengaged as previously described, there is no movement of the auger elevator and the shelled corn merely accumulates in hopper 223 until the elevator auger is again driven by returning the throwout clutch to the engaged position, thus to withdraw the corn temporarily stored in hopper 223.

Figure 15:
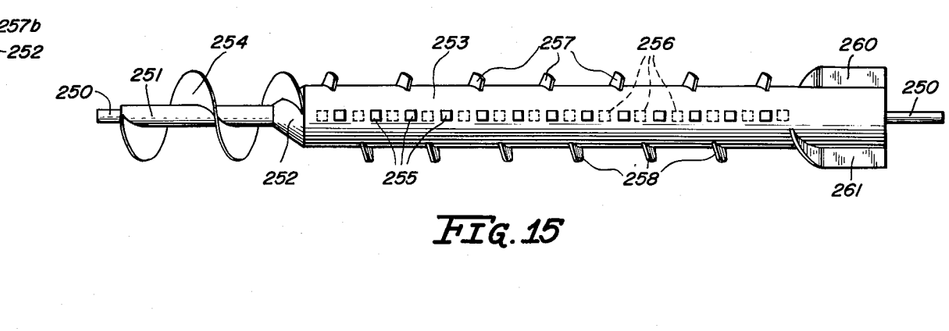
FIGURE 15 is a side view of another embodiment of a shelling cylinder.
Figure 16:
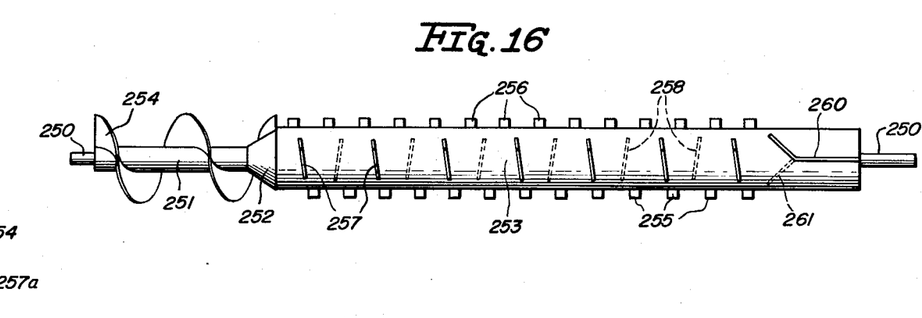
Figure 17:
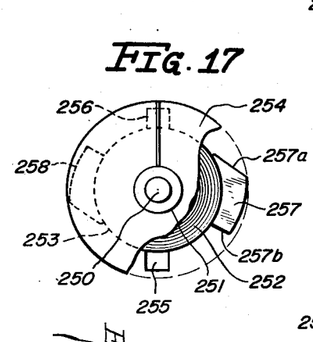
FIGURE 17 is an end view, of the embodiment shown in FIGURE 15.

By way of introduction to the construction of the shelling cylinder depicted in FIGURES 15–17, reference is made to the shelling cylinder 62 depicted in FIGURE 2 on which a plurality of impacting teeth or studs 64 are disposed. The teeth 64 are aligned in four linear arrays, each disposed 90° from the two adjacent arrays about the circumference of cylinder 62. Such a shelling arrangement operates efficiently to remove the kernels from the ears of corn passed thereto by the screwflight 63 at the front of the shelling arrangement. However, it has been determined that as the husks and other trash are separated during the shelling process, there is a tendency for the husks to be formed into "ropes" or strands of waste by the rotary action of the shelling cylinder within the concave. It is possible in the ejection of such ropes of waste material by paddles 69 at the rear of the shelling cylinder, the ropes may engage and brush or sweep out some of the shelled corn as the waste itself is ejected through discharge aperture 66 of the cob chute. Accordingly, it is manifestly desirable to retain the shelling efficiency of such an arrangement and obviate or minimize the loss of shelled corn as the trash is ejected.

It is the achievement of this latter objective, the efficient removal of husks and other waste without any significant loss of the clean corn, that is realized with the embodiment depicted in FIGURES 15–17. As shown in FIGURES 15 and 16, a central shaft 250 supports the shelling cylinder unit. A somewhat larger shaft section 251 is positioned at the forward end of shaft 250, and a frustoconical section 252 is positioned between shaft section 251 and the main body 253 of the shelling cylinder. The construction and function of screwflight 254, affixed to shaft section 251 as indicated, is similar to that of screwflight 63 in FIGURE 2, providing a positive feed of the snapped ears from the picking unit toward the shelling cylinder.

In accordance with this embodiment of the invention, a first array of studs or impacters 255 is positioned along one portion of shelling cylinder 253, and a second similar array including a plurality of teeth or impacters 256 is positioned on the diametrically opposite periphery of cylinder 253. Further in accordance with the inventive concept, a first plurality of impellers or vane-like elements 257 is positioned along the length of cylinder 253 as shown, disposed approximately 90° on the circumference from each of the rows of impacters 255 and 256, and a second array of impellers 258 is disposed on the cylinder on the diametrically opposite portion as is the impellers 257. It has been determined that this alternation of the impellers and impacters around the circumference of the shelling cylinder does an excellent job both of shelling the corn and of removing the cobs, husks, and other trash without ejecting any significant amount of the clean corn. Alternation of the impellers and impacters in each linear array has also been accomplished, with a somewhat lesser efficiency than has been realized with the embodiment illustrated in FIGURES 15–17. However, because this is another practical approach to accomplishing the ends of the invention, the term "alternation" of impacters and impellers as used herein and in the appended claims refers both to the illustrated embodiment and to a construction on which the impellers and impacters are alternated longitudinally rather than circumferentially of the cylinder.

An important structural feature of the impellers is best illustrated in FIGURE 17. As there shown, one of the impellers 257 has a leading edge 257a and a trailing edge 257b. The outer periphery of this impeller is not of a uniform curvature with respect to the center of shaft 250. Instead, the leading edge 257a terminates farther from the center of the shaft than does the trailing edge 257b, providing a gradual taper or reduction in the vertical extent of each impeller from its leading edge toward its trailing edge. Thus any cob which is caught and squeezed at the leading edge of an impeller will be gradually released as it is rolled toward the trailing edge, at which point there is a greater clearance between the impeller and the concave surface. Thus, even though elements 257 and 258 are denominated impellers, it appears from the operation thereof that there is actually a contribution toward the stripping of the kernels from the cob in addition to the efficient displacement of the husks and other trash toward the rear of the shelling cylinder.

A pair of combination impeller-and-paddle members 260 and 261 are affixed at the rear portion of cylinder 253. The forward or curved portion of each of these members acts somewhat like the impellers and serves to displace the trash rearwardly, and the main portions of members 260 and 261 function in much the same manner as do the paddles 69 in FIGURE 2 to displace the trash through the cob chute and discharge aperture after the shelling has been completed.

In FIGURE 1 the entire equipment, including the picker units, shelling units and conveying arrangements are illustrated in their operating positions. However, when encountering obstacles, making sharp turns, etc., it is frequently desirable to raise the picking units while the remainder of the apparatus remains in place. The structure for effecting such lifting of the picker units will now be described.

As shown in FIGURE 9, a rear portion of tractor 20 is designated by reference numeral 265. A lever 266 has a first end pivotally connected at 267 to a support bracket at the rear of tractor section 265, and a central portion of lever 266 is pivotally connected at 268 to one end of a cylinder assembly 270, the other end of which is pivotally connected by a rivet 271 or similar means to another support bracket on tractor section 265. The hydraulic fluid lines and the control means therefor, utilized to actuate cylinder assembly 270, have not been illustrated inasmuch as such means are well known and understood.

A cable 272 has one end thereof connected to the end of bracket 266 remote from the end connected at 267 to the bracket at the rear of the tractor, and cable 272 extends over a pulley 273 which is supported from a bracket 274 extending from assembly 153 in the hitch apparatus. Thence cable 272 extends forwardly, as illustrated in FIGURE 2, and passes around another pulley 275 affixed to a forward part of the tractor. Cable 272 extends downwardly and is connected to a suitable support point, referenced by numeral 276, on the picker unit at the left side of the tractor. Lever 266 can be the lift arm joined to the rockshaft (not shown) of the tractor and actuated by cylinder assembly 270 in conventional manner, and a similar cable lift arrangement is provided for the picker unit at the right side of the tractor, with another cable operated by a corresponding cylinder-and-lift arm arrangement at the other end of the rockshaft.

The invention is a sharp departure from known conventional methods of constructing corn picker-sheller arrangements, such as the prior art arrangement in which the corn is picked by units to either side of a tractor, and transported rearwardly for shelling in a unit disposed transversely with respect to the longitudinal axis of the tractor and positioned behind the tractor. In contradistinction to such arrangements, the present invention includes a sheller unit disposed immediately behind the picking element of the combination, to receive the picked corn directly therefrom and thus obviate the use of conveyors, husking units, etc. With this embodiment of the invention the sheller is disposed substantially over the rear drive axle of the tractor, thus to afford a better balance of the overall combination. In addition to the better balance thus realized, construction of the invention in the disclosed and illustrated form has reduced the weight of the total picking-shelling equipment substantially, that is, removing about one-third of the gross weight as contrasted to conventional picker-sheller units.

In addition to the foregoing advantages, a substantial advance has been made in the provision of the novel and unobvious shelling cylinder depicted in FIGURES 15–17, with the impellers and impacters positioned alternately on the cylinder. Such a construction has made possible the efficient removal of the trash with minimum waste of the clean shelled corn.

Although only a particular embodiment of the invention has been described and illustrated, it is apparent that modifications and alterations may be made therein. It is, therefore, the intention in the appended claims to cover all such modifications and alterations as may fall within the true spirit and scope of the invention.

What is claimed is:

1. In an agricultural apparatus for picking and shelling corn, the combination of:
   a picker unit positioned to pick ears of corn and forward the picked ears to a reference location;
   a sheller unit mounted with at least a portion thereof adjacent said reference location to receive the picked ears and effect a corn shelling operation;
   a positive feed means positioned adjacent said reference location to assist in forwarding the picked ears from said picker unit to said sheller unit;
   fan means including a duct disposed to direct an air current toward and into said one portion of the sheller unit to thereby force any loose kernels of corn into said sheller unit, and means for driving said fan means to produce an air stream through said duct of a velocity sufficient to save any kernels of corn which would otherwise be lost at the juncture of the picker and sheller units.

2. A picker-sheller arrangement for processing ears of corn including:
   a picker unit for picking ears of corn from stalks and forwarding the picked ears to and through a feed aperture at one end of said picker unit;
   a sheller unit mounted with an end portion thereof adjacent said reference aperture for receiving the picked ears from said picker unit;
   positive feed means positioned adjacent said reference aperture for assisting in movement of the picked ears to and through said aperture and adjacent said shelling means, certain of the kernels on the ears thus forwarded being dislodged by said positive feed means;
   fan means, including a channel for directing air movement, aligned to provide an air stream through at least a portion of said entrance aperture in the same direction as the ears of corn are displaced by said positive feed means, and means for driving said fan means to produce an air stream through said channel of sufficient velocity to impel said certain kernels through said entrance aperture into the sheller unit, thus preventing the loss of such kernels.

3. For use with a tractor, a corn picking unit mounted adjacent the waist portion of the tractor, and a shelled corn conveyor system mounted adjacent the rear portion of the tractor, the improvement which comprises:
   a corn shelling unit positioned intermediate said picking unit and said conveyor system, including
   a first chamber having first air movement means therein,
   a second chamber connected with said first chamber and having shelling means therein,
   a third chamber connected with said second chamber and having second air movement means therein,
   means including said chambers for defining an air flow path including at least a portion of each of said chambers;
   and means for driving said first and said second air movement means, thereby to provide air movement along said air flow path both to prevent the loss of shelled corn at one end of the second chamber and to remove light trash and dirt from the other end of said second chamber upwardly through said third chamber.

4. For use with a tractor, a corn picking unit mounted adjacent the waist portion of the tractor, and a shelled corn conveyor system mounted adjacent the rear portion of the tractor, the improvement which comprises:
   a corn shelling unit positioned intermediate said picking unit and said conveyor system,
   including a housing having upper and lower chambers,
   a bulkhead in the upper chamber of said housing to effectively divide said upper chamber into first and second upper chambers,
   a first air movement means in said first upper chamber,
   a second air movement means in said second upper chamber,
   shelling means in said lower chamber,
   and means including said housing for defining an air flow path through at least a portion of said first upper chamber into said lower chamber adjacent one end thereof, thence axially through at least a portion of said lower chamber, into said second upper chamber, and outwardly from said second upper chamber;
   and means for driving said first and said second air movement means, thereby to provide air movement along said air flow path both to prevent the loss of shelled corn at said one end of the lower chamber and to remove light trash and dirt from the other end of said lower chamber upwardly through said second upper chamber.

5. A conveying system for crop material including:
   a first housing apertured at one end thereof to define a first opening,
   a first auger supported within said first housing for delivering crop material toward said one end thereof,
   a second housing disposed substantially perpendicular to said first housing and apertured to define a second opening at one end thereof,
   said first and second housings being positioned in abutting relation and aligned so that said openings effectively define a common aperture between said housings, said second housing being at an elevation higher than said first housing,
   a second auger supported in said second housing to effect movement of crop material from said common aperture toward the other end of said second housing;
   and means for effecting rotation of said first and second augers, whereby crop material is fed through said first housing, through said common aperture, and through said second housing.

6. In combination with a tractor having a waist portion and a rear axle supporting a pair of rear drive wheels spaced outwardly from the body portion of the tractor, a corn picking arrangement disposed adjacent the waist portion of the tractor, and a shelled corn conveying system disposed adjacent the rear of the tractor, the improvement which comprises: a corn shelling unit, positioned above said axle in the area between one of said drive wheels and a body portion of the tractor, having one end of the shelled unit disposed adjacent said corn picking arrangement and the other end of said shelled unit disposed adjacent said conveying system, for receiving the picked ears of corn from the corn picking arrangement and passing the shelled corn to the conveying system, and positive feed means, positioned adjacent the junction of said sheller unit and corn picking arrangement for engaging the picked ears of corn and assisting in the transfer thereof between said picker unit and said sheller unit, said positive feed means including a shaft journaled in suitable supports near one end of said picker unit adjacent said sheller unit, paddle means affixed to said shaft and extending therefrom in a position to strike the ears of corn as said shaft is rotated and impel said ears from said picker unit towards and into said sheller unit, and drive means for effecting rotation of said shaft and the consequent positive feeding of the ears of corn.

References Cited in the file of this patent

UNITED STATES PATENTS

| | | |
|---|---|---|
| 1,968,998 | Elliott | Aug. 7, 1934 |
| 2,100,137 | Groves | Nov. 23, 1937 |
| 2,318,400 | Hyman | May 4, 1943 |
| 2,337,592 | Coultas et al. | Dec. 28, 1943 |
| 2,379,803 | Hyman | July 3, 1945 |
| 2,484,999 | Hyman | Oct. 18, 1949 |
| 2,651,158 | Richardson | Sept. 8, 1953 |
| 2,678,652 | Bryant | May 18, 1954 |
| 2,927,587 | Arms | Mar. 8, 1960 |
| 2,954,657 | Pool et al. | Oct. 4, 19960 |
| 2,979,877 | Scranton | Apr. 18, 1961 |